Feb. 26, 1952  H. G. ALLEN ET AL  2,587,271
DINNERWARE FINISHING MACHINE
Filed Dec. 1, 1948  7 Sheets-Sheet 4
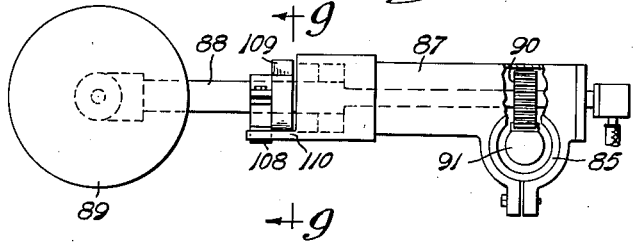
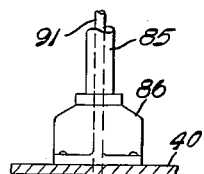
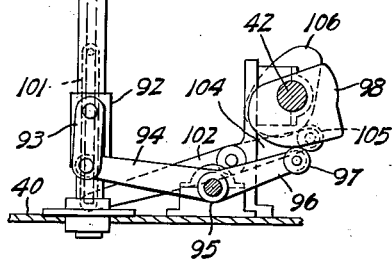
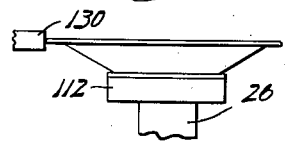
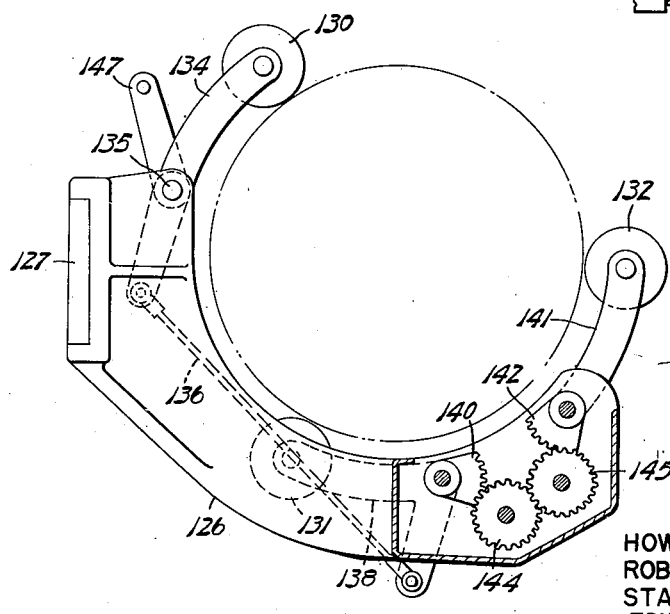
INVENTORS
HOWARD G. ALLEN
ROBERT W. WATKIN
STANLEY KUFEL, JR.
EDWARD I. FISHER
BY Bean, Brooks, Buckley & Bean.
Attorneys Feb. 26, 1952 H. G. ALLEN ET AL 2,587,271
DINNERWARE FINISHING MACHINE
Filed Dec. 1, 1948 7 Sheets-Sheet 5

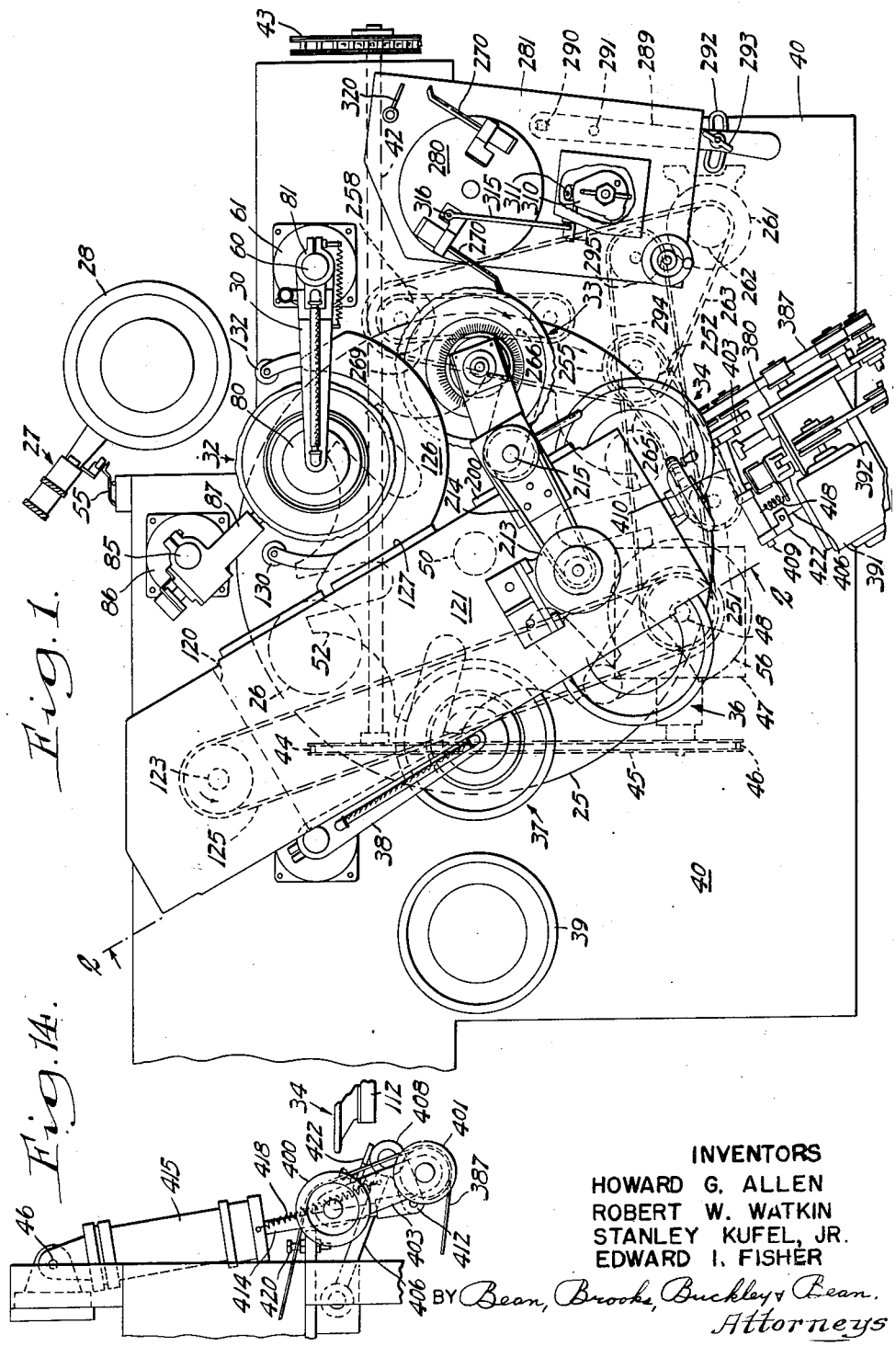

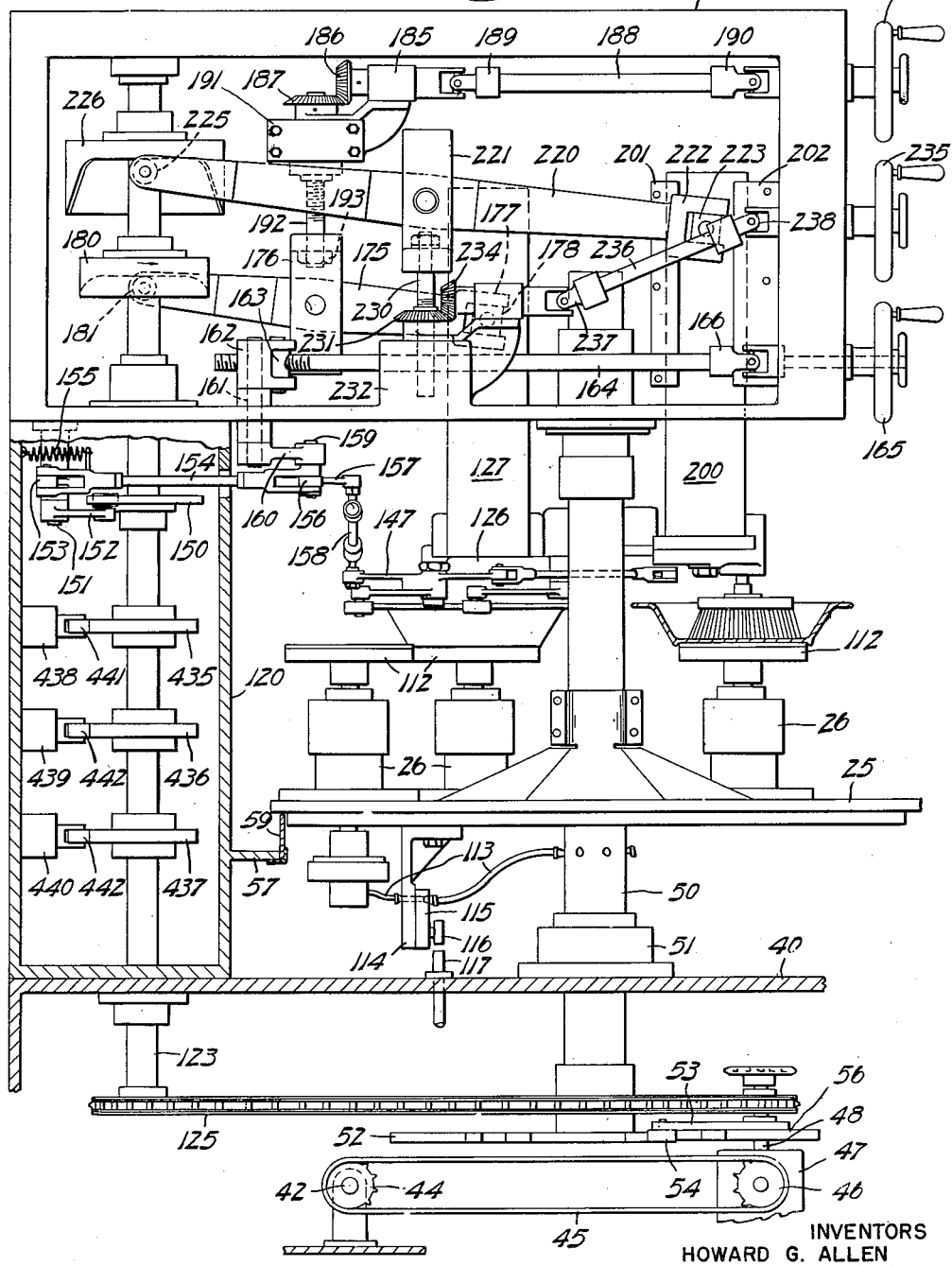

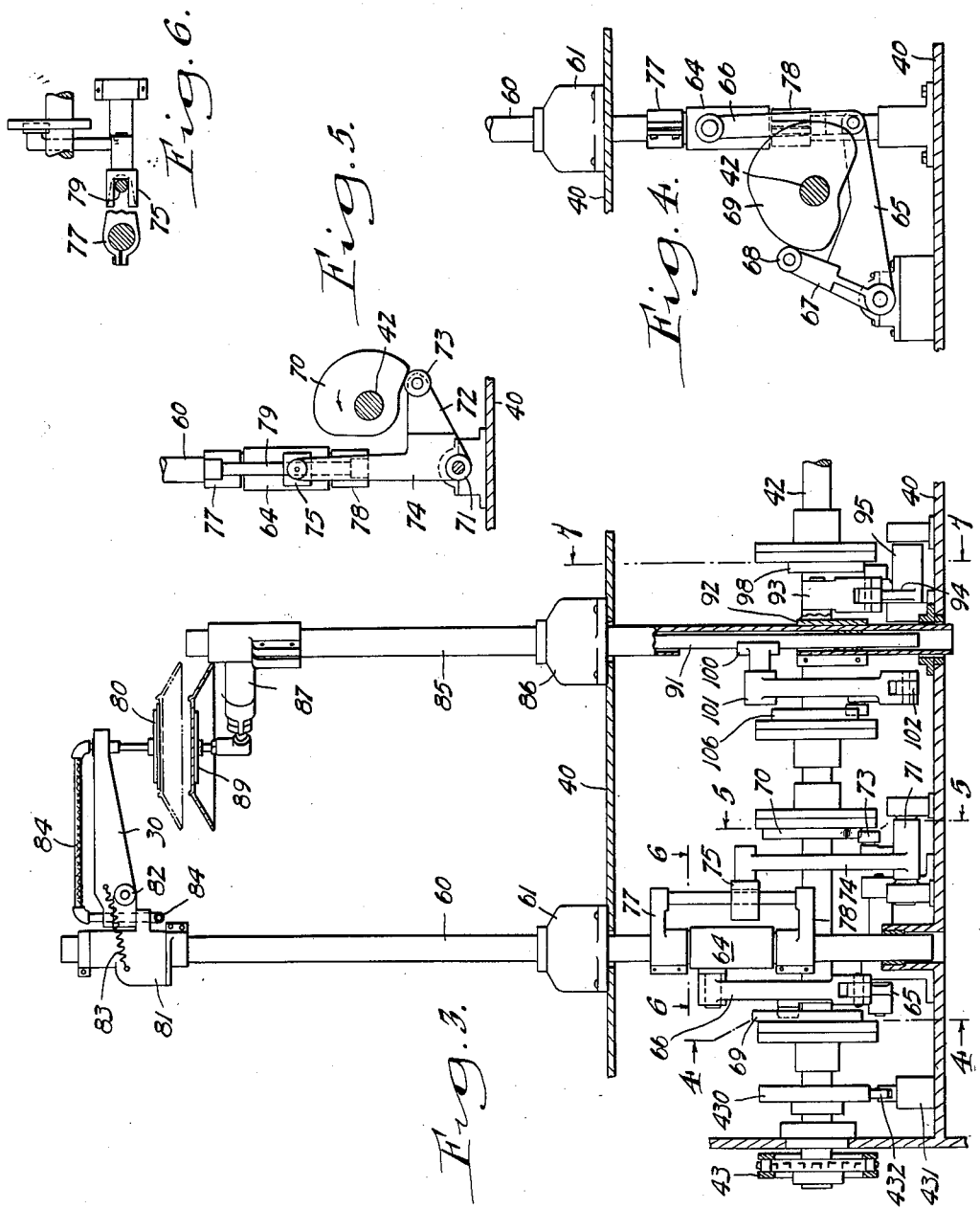

INVENTORS
HOWARD G. ALLEN
ROBERT W. WATKIN
STANLEY KUFEL, JR.
EDWARD I. FISHER
BY Bean, Brooks, Buckley + Bean.
Attorneys Feb. 26, 1952  H. G. ALLEN ET AL  2,587,271
DINNERWARE FINISHING MACHINE
Filed Dec. 1, 1948  7 Sheets-Sheet 6

INVENTORS
HOWARD G. ALLEN
ROBERT W. WATKIN
STANLEY KUFEL, JR.
EDWARD I. FISHER
BY Bean, Brooks, Buckley & Bean,
Attorneys

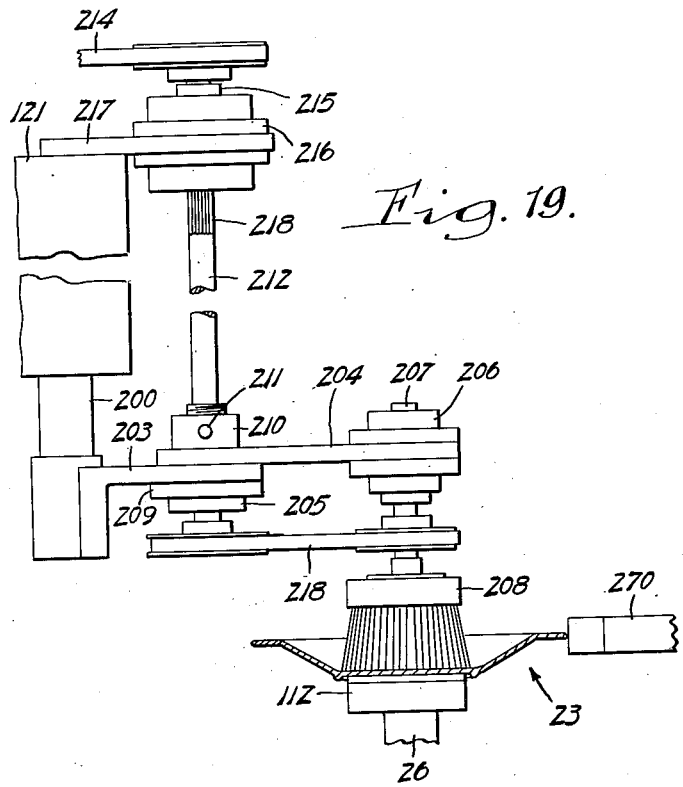

Patented Feb. 26, 1952

2,587,271

UNITED STATES PATENT OFFICE 2,587,271

DINNERWARE FINISHING MACHINE

Howard G. Allen, Niagara Falls, N. Y., Robert W. Watkin, East Liverpool, Ohio, Stanley Kufel, Jr., Cheektowaga, and Edward I. Fisher, Kenmore, N. Y., assignors to The Edwin M. Knowles China Company, Newell, W. Va.

Application December 1, 1948, Serial No. 62,888

24 Claims. (Cl. 25—22)

This invention relates to a method and apparatus for use in the manufacture of dinnerware and the like from plastic material such as clay, and more particularly to a method and apparatus for performing certain operations on dried green ware after it has been pressed and jiggered, and before firing.

After dishes, plates, bowls, or various other objects of dinnerware or the like have been pressed and jiggered, they have a rough fin of flash about their edges which at the present time, is removed manually after the ware has been dried to what is known in the art as a "green" condition. The present method and apparatus provide automatic means for treating the edges of ware to remove this objectionable flash or fin and leave the edges of green ware smooth and accurately and uniformly rounded before the ware is fired.

Further, the present method and apparatus treats the pressed surface of the ware to remove certain imperfections which remain after the ware comes from the pressing an jiggering apparatus. These imperfections occur in the well portions of the ware where it has been pressed against the mold and constitute, generally, minute random protuberances resulting from imperfections in the mold surface.

The method and apparatus of the present invention amounts to much more than a mere mechanization of previous manual methods since the mode of operation followed in manually treating the edges of green ware to remove the flash is not susceptible, from a practical standpoint, of mere mechanization. The present method and apparatus attains the desired end result by a basically different treatment of the edges of the ware. In prior art practice it has been usual to scrape the edges of the ware to roughly remove the flash and then wipe the edges of the ware with a moist cloth or sponge to smooth the same. Obviously, this procedure produced work lacking in uniformity and of varying quality, and the considerable manual handling resulted in a high percentage of breakage of the green ware, the latter being quite fragile and delicate before firing.

The absolute uniformity of the edges of ware which are finished automatically, both as to contour and the degree of smoothness, results in ware of superior quality to any heretofore produced in these respects. Further, the entire elimination of the factor of human error in the handling of the green ware reduces to an insignificant amount the breakage of ware which has been brought to this stage of completion. The handling of ware after firing is, of course, not nearly so delicate a matter as before firing.

While the method and apparatus of the present invention are useful and usable in acting upon workpieces of this general class regardless of the methods and apparatus by which their manufacture is brought to the point where the present method and apparatus begins, the present invention may be employed to particular advantage in conjunction with automatic ware-forming machines to provide a continuous and completely automatic manufacturing process preparatory to firing of the ware. Reference is had by way of example to pressing and jiggering apparatus shown in United States Letters Patent to Walter H. Emerson, No. 2,321,471, dated June 8, 1943, and No. 2,362,058, dated November 7, 1944.

In using the pressing and jiggering apparatus of the foregoing patents, the ware passes to a drier by way of a conveyor system which handles the ware in the pressing and jiggering machine and carries it continuously through the drier to an unloading station. This conveyor system is illustrated in further Letters Patent to Walter H. Emerson, No. 2,261,149, dated November 4, 1941.

In one convenient mode of practicing the present invention the present apparatus may be arranged to take the green ware directly from the conveyor system disclosed in the patent last enumerated above without intermediate handling. According to the method shown in the Emerson patents, articles such as plates, bowls or the like are pressed in inverted position upon molds which form the inside of the ultimate dish or bowl and the molds themselves rest upon rings which are fixed to the conveyor system, the molds being successively lifted from the rings in the pressing and jiggering machine and returned to the rings after pressing and jiggering has been effected.

The ware remains on the top of the mold in inverted position as its passes through the drier and until it reaches the unloading station. In one form the apparatus of the present invention is arranged to pick the ware off of the molds at the unloading station of the foregoing conveyor system and subsequently treat it to finish the interior surface or well thereof and also finish the edge preparatory to firing.

The conveyor which brings ware from the pressing and jiggering apparatus through the drier and to the apparatus of the present invention is not uniform in its action and is subject to "surging." The present apparatus accommodates itself readily to this condition by automatically beginning a cycle of operation upon the arrival of a piece of ware on the conveyor at the proper position for reception by the apparatus of the present invention. After the present invention completes a full cycle of operation, which is accomplished in any event before the arrival of the next piece of ware on the conveyor, operation of the present apparatus automatically terminates until such subsequent piece of ware reaches a proper reception position on the conveyor, when a subsequent cycle of operation again automatically begins.

In the preferred form of apparatus shown herein by the way of example the operation is highly flexible since very simple adjustments, requiring no dissassembling or interchanging of parts, set the machine to handle ware of various diameters and depths. The apparatus works just as effectively on festooned or otherwise irregularly ornamented edges as it does on truly circular ware.

While a full and complete embodiment of one mode of practicing the present invention is shown in the accompanying drawings and described in detail in the following specification to comply with the patent statutes, it is to be understood that the spirit of the invention is not limited to the machine shown by way of example, and that many mechanical modifications may be made without departing from the principles taught herein. The scope of the invention is not limited excepting as defined in the appended claims.

In the drawings:

Fig. 1 is a general top plan view of one form of the apparatus of the present invention;

Fig. 2 is a general elevational view of the machine with portions thereof broken away and other parts shown in cross-section for added clarity of illustration, the view being taken generally from the direction indicated by the line 2—2 of Fig. 1, excepting as to the lower drive portion which is taken directly from the left of Fig. 1;

Fig. 3 is a fragmentary elevational view of the means for introducing the ware to the apparatus viewed generally from the upper side of Fig. 1;

Fig. 4 is a fragmentary cross-sectional view on line 4—4 of Fig. 3;

Fig. 5 is a fragmentary cross-sectional view on line 5—5 of Fig. 3;

Fig. 6 is a fragmentary cross-sectional view on line 6—6 of Fig. 3;

Fig. 7 is a fragmentary cross-sectional view on line 7—7 of Fig. 3;

Fig. 8 is a top plan view of the means for inverting the ware in the process of introducing it to the apparatus;

Fig. 9 is a cross-sectional view taken on the line 9—9 of Fig. 8;

Fig. 10 is a fragmentary top plan view of mechanism for centering the ware on the work holding turrets of the apparatus with a portion thereof in cross-section;

Fig. 11 is a fragmentary elevational view of a work holding turret with one of the centering elements of Fig. 10 acting against a piece of ware;

Fig. 14 is a view similar to Fig. 13 but showing the final finishing mechanism in idle position between cycles of operation;

Fig. 18 is a schematic view showing the sequence of operations of the scraping elements; and Fig. 19 is a fragmentary elevational view of the mechanism for brushing the well portions of the ware to smooth the surface thereof.

Figures 12, 13:
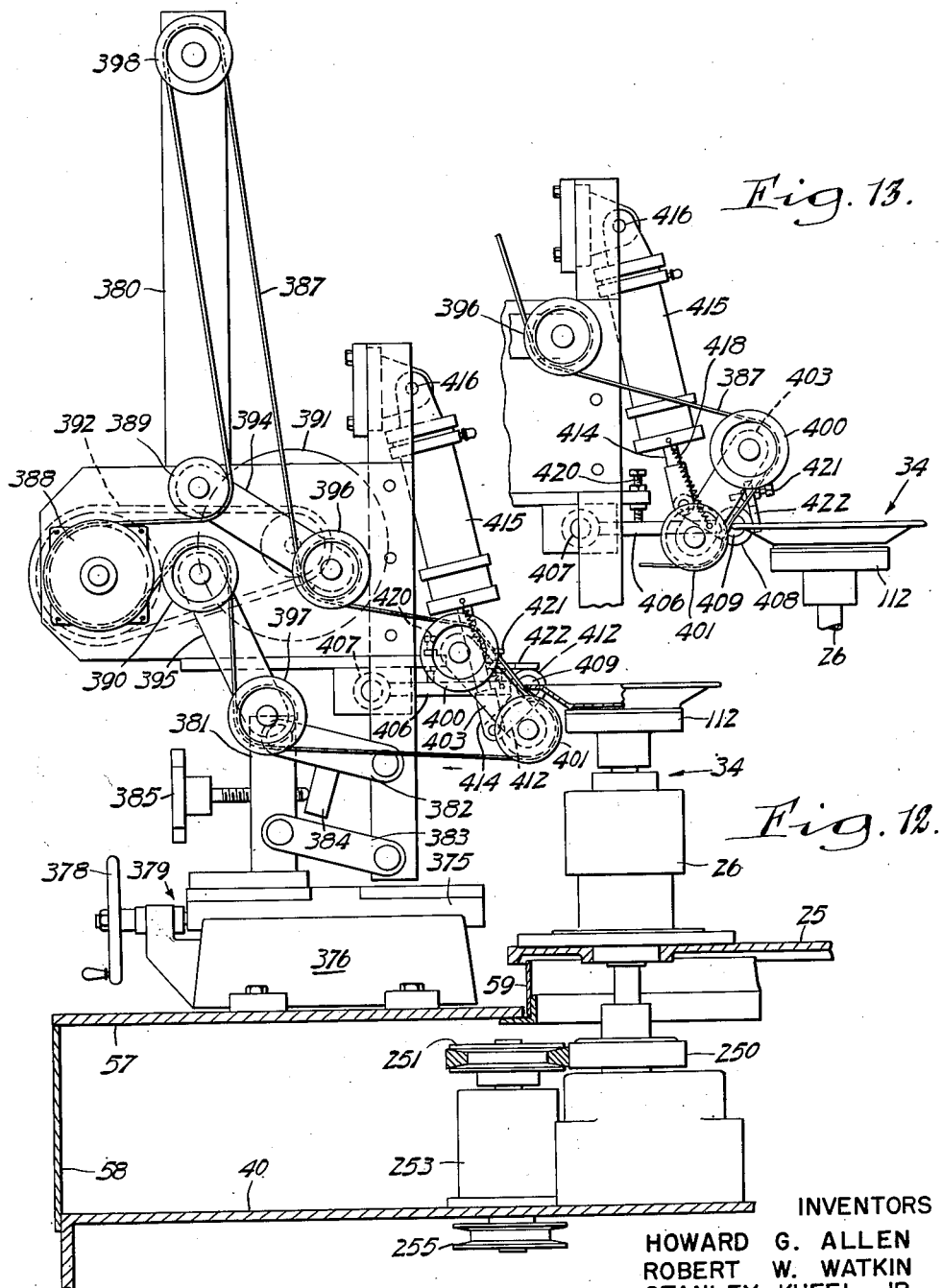
Fig. 12 is a general elevational view of the mechanism for performing the final finishing operation on the edge of a piece of ware.
Fig. 13 is a view similar to Fig. 12 but showing only a portion of the mechanism in another phase of its cycle of operation.

Throughout the several figures of the drawings, like characters of reference denote like parts. The form of machine set forth herein by way of example comprises generally a rotatable table 25 having a plurality of equally spaced turrets 26 mounted thereon for receiving and supporting work pieces. The table is adapted to be rotated by increments to successively move turrets 26 to various work stations of the machine.

Referring to Fig. 1, the numeral 27 designates generally a vertically moving conveyor chain which moves upwardly to bring plates or other dishes serially to the position indicated at 28 in Fig. 1.

This chain may be the same as or similar to the chain at the unloading station of the above-identified conveyor patent to Emerson, although, of course, it is not necessarily so. The element indicated at 28 in Fig. 1 is the mold part which rests upon a ring attached to the conveyor and upon which the piece of ware is pressed and jiggered, the upper surface of the mold conforming to the inner contour of a plate, bowl, or other piece of ware. The piece of ware continues to rest on the mold through the drying step and until it is removed at the unloading station.

Still referring to Fig. 1, the numeral 30 designates an arm which is arranged to oscillate from a position above the mold 28 to the position in which it is illustrated in Fig. 1 to move successive pieces of ware to a receiving, turn-over and centering station which is designated generally 32 in Fig. 1. At the turn-over station the ware is moved from its inverted position to an upright position and is deposited on a work-receiving turret 26, and means are provided for accurately centering the dish relative to the turret before the application of suction to the turret to secure the piece of ware firmly thereto.

The next successive circumferential work station is designated generally 33 in Fig. 1 and includes means operable automatically to scrape the edge of the dish to round it off and remove the flash which results from the previous forming of the ware, as described previously herein. Means are also provided at the scraping station designated 33 for brushing the inner surface or well of the dish or other ware to remove the slight protruding imperfections from the surface of the dish in this area, again as referred to previously herein.

From the scraping station the ware-carrying turrets 26 move to a final edge finishing station designated 34 in Fig. 1 where the edges of the work pieces are treated in a novel manner to smooth them quickly and efficaciously and by a method not heretofore contemplated in the pottery art. This operation amounts to a very fine abrading or polishing step on the dry green ware with no accompanying liquid or moisture treatment.

So far as the present invention is concerned, the edge finishing station 34 is the final operative station with which the present invention is concerned. The next succeeding station designated 36 is an idle station so far as the present invention is concerned, although it may be utilized for other fabricating steps as occasion may arise. The station designated 37 in Fig. 1 is the removal or discharge station, and the removal or discharge arm is designated 38 and is arranged to swing from the removal station to a position indicated at 39 for delivering the work from the machine.

The general drive of the machine is illustrated in Figs. 1 and 2 and is housed within a base element 40 which also rotatably supports table 25. The input drive of the machine is to a cam shaft 42 which is shown in greater detail in Fig. 3, cam shaft 42 being driven by a chain and sprocket drive designated 43 in Figs. 2 and 3, the driving power coming from any suitable motor drive or other power supply. At its opposite end cam shaft 42 carries a sprocket 44 which is connected by means of a chain 45 to a sprocket 46 which is fixed to the input shaft of a conventional right angle gear drive unit 47, whose output shaft projects upwardly therefrom and is designated 48 in Figs. 1 and 2.

Table 25 has a fixed central supporting shaft 50 which is rotatably mounted in a bearing 51 carried by base element 40, and shaft 50 projects downwardly through the upper wall of base element 40 and carries a Geneva wheel 52 at its lower end. Shaft 48 of the right angle drive unit 47 has fixed thereto an arm 53, the outer end of which carries a roller 54 for operating the Geneva wheel in the usual manner to oscillate it through an angle corresponding to the angle between the respective work stations described above and the usual arcuate locking block for holding the Geneva wheel 52 between oscillations by engagement with arcuate recesses in the periphery thereof is designated 56 in Figs. 1 and 2.

To assist in a general understanding, it may be well to point out at this time that cam shaft 42 and the Geneva operating shaft 48 have a 1:1 ratio. The operation of the machine is cyclic, an initiation of an operating cycle is set off by arrival of a work piece at the entry station, in the position indicated by mold 28 in Fig. 1, and operates continuously and automatically through one complete rotation of cam shaft 42 and Geneva shaft 48. Means in the form of a limit switch 55, Fig. 1, may be provided for energizing a main drive motor or for engaging a clutch to start a cycle of operation and other means may be provided upon cam shaft 42 for terminating the operation when such one complete rotation ends, in the nature of a cam or the like, or the input end of cam shaft 42 may incorporate a conventional single revolution clutch.

Generally speaking, the various cams, levers and other operating instrumentalities are shown, throughout the several views, in the positions they occupy between cycles; that is, when the machine is at rest and waiting for the arrival of a piece of ware at the appropriate point for initiating a cycle of operation, the first portion of which is devoted generally to indexing table 25 to advance each turret to the succeeding work station. Certain exceptions to the foregoing statement about the relative positions of the parts in the drawings will be noted as the present description proceeds.

Disposed above the top of base 40 is a further plate or table element 57 which appears in Figs. 2 and 12 and may be fixed relative to the general framework of the machine in any desired manner as by means of vertical plate members, one of which is designated 58 in Fig. 12. Plate 57 has a circular opening concentric with table 25 and has fixed thereat shroud or guard ring 59 which extends upwardly beneath the marginal edge of table 25 and cooperates with plate 57 to serve as a guard for the mechanism therebeneath.

Reference will now be had particularly to Figs. 1 and 3 through 6, the latter group illustrating in detail the construction and operation of the mechanism for picking up ware from molds on the conveyor, moving the ware to a position of vertical alignment with a turret at the entry station, inverting the ware to a right side up position, and subsequently depositing it upon the turret 26.

Pickup arm 30, Figs. 1 and 3, is fixed to a shaft 60 which is rotatable and slidable in a bearing 61 fixed to the top of base 40. The showing in Figs. 1 and 3 of pick-up arm 30 is one exception to the above statement pertaining to the relative positions of the various parts since the idle position of pick-up 30 between cycles is mid-way between the position illustrated in Figs. 1 and 3 and the position where the outer end of pick-up arm 30 is concentric with mold element 28 on the conveyor mechanism.

The swinging and raising and lowering movements of pick-up arm 30 are derived from cams fixed to the cam shaft 42. Referring to Figs. 3 and 4, shaft 60 has a sleeve 64 fixed thereto and one arm of a raising and lowering bell crank for shaft 60 is designated 65 and is connected to sleeve 64 by means of a link 66 which is pivoted at its opposite ends to sleeve 64 and the outer end of arm 65. The other arm of the bell crank is designated 67 and carries a cam follower 68 which engages a cam 69 on cam shaft 42. The shaft 60 and pick-up arm 30 urge link 66 downwardly by reason of their weight, and the follower 68 is accordingly held yieldingly against cam 69 by the force of gravity. Obviously, a rise in the contour of cam 69 raises link 66 and accordingly raises pick-up arm 30.

A second cam designated 70 is fixed to cam shaft 42 and is shown in detail in Fig. 5. A second bell crank 71 has one arm 72 thereof extending beneath cam 70 and carries a cam follower 73 for engagement therewith. The other arm of bell crank 71 is designated 74 and extends generally upwardly, having at its upper end a yoke member 75 which is pivoted to arm 74 for free rotation about a horizontal axis.

Shaft 60, in addition to sleeve 64, has a pair of arms 77 and 78 fixed thereto, and the outer ends of arms 77 and 78 support a shaft element 79 which is parallel and spaced from shaft 60. It will be seen from the foregoing that oscillation of the bell crank 71 by cam 70 will swing yoke 75 in a plane perpendicular to Fig. 3 and thus swing shaft element 79 and oscillate arms 77 and 78 to thus oscillate pick-up arm 30 between the mold position designated by the numeral 28 and the first turret station 32.

The cams 69 and 70 are so timed that, at the beginning of the cycle of operation, arm 30 swings from a mid-position to a position vertically coincident with mold element 28. Cam 69 then falls off in contour so that pick-up arm 30 lowers and a suction pick-up pad 80 at its lower end engages an inverted piece of ware on mold 28 from above. After having picked up the dish, arm 30 again rises due to a rise in the contour of cam 69 and then swings to the position illustrated in Figs. 1 and 2 through the operation of cam 70 of Fig. 5, acting through rocker arm 71 and offset shaft 79. The pick-up arm 30 need not raise or lower in the position illustrated in Figs. 1 and 3.

As appears from Fig. 3 pick-up arm 30 is pivoted to a clamp element 81 as at 82, the clamp element being adjustably fixed to shaft 60, and the clamp element and pick-up arm have ledges which normally abut by reason of the action of an extension coil spring 83. The vacuum line to pad 80 is designated 84 and includes passage portions or holes which extend directly through the abutting ledges of clamp element 81 and pick-up arm 30. If it should happen that a mold 28 on the conveyor chain did not carry a piece of ware when it arrived at the pick-up point, the action of the pad 80 would normally be to pick the mold itself off of the supporting ring of the conveyor. Introduction of a mold part to the finishing machine in this manner would seriously damage the machine if not detected.

However, by reason of the construction just described, if pad 80 began to lift a mold 28 from the supporting ring of the conveyor by reason of the absence of a piece of ware thereon, the much greater weight of the mold element than the usual piece of ware would cause spring 83 to extend, pivoting the pick-up arm downwardly about pivot 82, the abutting ledges of clamp 81 and pick-up arm 30 would separate, breaking the vacuum line 84 and thereby immediately dropping the mold element back upon the supporting ring of the conveyor. As soon as the mold part is dropped and the spring 83 is relieved the pick-up arm 30 returns to the illustrated position for the next pick-up operation.

Apparatus for receiving the pieces of ware from the pick-up arm 30 and for reversing their position to dispose them right-side up is carried by a shaft 85 which is likewise supported for rotative and vertical sliding movement relative to the top of base 40 by means of a bearing 86 fixed to the latter. The transfer and turn-over arm is designated 87 in Figs. 1, 3, and 8, and the mechanism for controlling its operation is illustrated in Figs. 3 and 7 through 9.

Turn-over arm 87 is fixed rigidly but adjustably to shaft 85 and gives bearing support to a shaft 88 which has a vacuum pick-up device 89 at its outer end and a pinion 90 at its inner end in registry with shaft 85. Shaft 85 is hollow, and a rod 91 is slidable concentrically therein. The upper end of rod 91 has a rack formation in mesh with pinion 90 so that up and down movement of rod 91 relative to shaft 85 rotates pinion 90, shaft 88, and accordingly vacuum pick-up element 89.

At its lower end shaft 85 has fixed thereto a sleeve 92 to which is pivoted one end of a generally vertical link 93. The other end of link 93 is pivoted to the outer end of one arm 94 and a bell crank 95 which, like the bell cranks just described, has pivot bearing on the bottom wall of base 40. The other arm 96 of bell crank 95 has a follower 97 which engages the under side of a cam 98 on cam shaft 42.

A bracket 100 is fixed to rod 91, extending through a slot formed in the side of shaft 85, and is pivoted to the upper end of a link 101, whose lower end is pivoted to one arm 102 of a rock shaft, the other arm 104 of which is provided with a cam follower 105 in engagement with a cam 106 on cam shaft 42. The operation of transferring a piece of ware from pick-up arm 30 to a turret 29, and inverting the piece of ware in the process will now be described, beginning with the cams in the position illustrated in Fig. 7.

In the position illustrated in Fig. 7, the turn-over arm 87 and holder 89 have moved up to a maximum height and received ware from holder 80 and lowered to a point where the turn-over begins. At this point there is a dwell in raising and lowering cam 98, and cam 106 has a rising contour which raises link 101 and causes pinion 90 to rotate and reverse the position of holder 89 through 180° about the axis of shaft 88.

Referring to Figs. 8 and 9, a pair of stop lugs 108 and 109 are adjustably fixed to shaft 88 and, in the up position of holder 89 shown in Fig. 9, lug 108 is in engagement with one side of a projection 110 which is fixed relative to arm 87. The rotating movement just described causes lug 108 to move away from stop 110 and causes lug 109 to move toward and against the other side of stop 110 when 180° of rotating movement of shaft 88 has taken place.

At this point in the operation the dwell of cam 98 ends and its contour again falls off so that bell crank 95 oscillates in a counterclockwise direction and further lowers shaft 85 to move the ware down upon a vacuum holder of the turret 26 which is at the initial station 32. The several vacuum holders of turrets 26 are designated 112 throughout the several figures. When the ware is thus deposited upon a particular turret and after it has been centered thereon by means about to be described the vacuum holder 112 thereof is automatically energized.

The source of vacuum comes down through the central shaft 50 of table 25 and a separate conduit 113 therefrom leads to each turret 26 of table 25. A valve device 114 is interposed in each conduit 113 and has a vertically movable valve part 115 and a valve shifting roller 116. As shown in Fig. 2, valve part 115 is in its upper on position. It is moved to this position by a push rod 117 supported by base 40 and extending downwardly where it is engageable by a cam (not shown) on cam shaft 42. The roller 116 of each movable valve part 115 registers vertically with push rod 117 when the particular turret with which it is associated is at the receiving and centering station.

The vacuum to each holder 112 remains on through the several succeeding work stations until the particular turret has almost reached discharge station 37 when roller 116 is engaged at its upper side by an abutment (not shown) which is fixed to the top of base 40 in position to cam roller 16 downwardly and thus disconnect the vacuum to the particular turret.

Following the depositing of the piece of ware upon holder 112 at the initial work station 32 and before the vacuum of holder 112 is turned on as just described, the ware is accurately centered relative to the turret 26 by means illustrated in Figs. 1, 2, 10, and 11, particularly Fig. 10.

A column 120 is rigidly secured to bed 40 and rises upwardly therefrom to a position generally over the several work stations where it supports an upper casing 121 which extends outwardly from column 120 over the table 25 and encloses certain operating mechanism to be described subsequently. A drive shaft for the mechanism in casing 121 and for other functions is designated 123 in Fig. 2, and, as there shown, has bearing in base 40 and the upper and lower walls of upper casing 121, extending continuously from a point beneath the top of base 40 upwardly through column 120 and casing 121. At its lower end shaft 123 has chain and sprocket connection with the output shaft 48 of the right angle drive unit 47 as indicated at 125 in Figs. 1 and 2, particularly the latter.

The centering mechanism at the entry station designated 32 is supported generally by a bracket 126 which is shown best in plan in Fig. 10 and appears also in Fig. 2. Bracket 126 is suspended from casing 121 by means of a vertically extending bar 127 which is fixed at its lower end to bracket 126 and is vertically guided by portions of casing 121. The entire centering mechanism supported by bracket 126 from bar 127 is periodically raised and lowered whereby upward movement clears the ware and permits its movement horizontally to and from the station 32. Bracket 126 is also adjustable vertically to accommodate the centering mechanism to ware varying in depth in a manner which will presently appear.

Referring to Fig. 10, three centering rollers of rubber or the like are designated 130, 131, and 132, and one of these rollers is indicated fragmentarily in Fig. 11 in edgewise engagement with a piece of ware on a holder 112 of a turret 26. Roller 130 is supported for free rotation at one end of a rock arm 134 which is medially pivoted to bracket 126 as at 135 and has its opposite end pivoted to a link 136. Roller 131 is rotatably supported at the end of one arm of a bell crank 138 whose other arm pivotally engages the opposite end of link 136.

Bell crank 138 has fixed thereto a toothed sector 140 and the remaining centering roller 132 is supported from a pivoted arm 141 which likewise has fixed thereto a toothed sector 142. A pair of intermeshing pinions 144 and 145 are journaled for free rotation in bracket 126 and the pinions 144 and 145 likewise mesh with toothed sectors 140 and 142, respectively. Rock arm 134 has fixed for pivotal movement therewith an arm 147 which comprises the operating arm for the centering rollers.

It will be seen from the foregoing that oscillation of the arm 147 in a counterclockwise direction as viewed in Fig. 10 will swing the three centering rollers jointly away from the ware while oscillation in a clockwise direction will bring the three rollers into resilient edgewise engagement with the ware to center the same. Movement of the centering rollers in this manner is accomplished by means of a cam 150 which is fixed to vertical shaft 123 within column 120. Cam 150 merely has a single lobe for momentarily moving rock arm 147 in a clockwise direction to the position illustrated in Fig. 10.

As viewed in Fig. 2 a rocker arm pivoted to the machine frame as at 151 comprises a rearwardly extending cam follower arm 152 and a forwardly extending arm 153 which pivotally engages a link 154. An extension coil spring 155 retains the follower of arm 152 in engagement with cam 150. Link 154 acts upon a bell crank which has a forwardly extending arm 156, as viewed in Fig. 2, to which link 154 is pivoted, and an arm 157 which extends to the right and is pivotally connected to a link 158 which extends rearwardly therefrom, as viewed in Fig. 2, to pivotal connection with arm 147. The medial fulcrum support of bell crank 156, 157 is designated 159 and is adjustably supported at the outer end of an arm 160 fixed to a rock shaft 161 journaled in the bottom wall of casing 121.

A second arm 162 is fixed to rock shaft 161 within casing 121 and extends generally rearwardly as viewed in Fig. 2. The outer or rear end of arm 162 is bifurcated and carries a rotatable vertical pin 163 which is threaded to receive an adjusting screw 164. A handwheel 165 for adjusting the centering means for ware of different diameters is journaled in casing 121 as shown in Fig. 2 and is connected to screw 164 by means of a universal joint 166. Screw 164 may thus be rotated to adjust the location of the fulcrum of bell crank 156, 157 in a manner which is believed to be obvious from the foregoing and such adjustment alters the limits of inward movement of rollers 130, 131, and 132 under the influence of cam 150 to adjust the centering operation to ware of various diameters.

The means for lowering the centering mechanism to present it to the ware and periodically raising it in timed relation with the indexing of the turret to clear the ware, and also the means for adjusting the height for the centering mechanism to suit ware of various depth, will now be described. Referring to Fig. 2, a lever 175 is pivoted medially to a yoke 176 and one of its ends is bifurcated as at 177 to engage a block 178 which is pivoted to the bar 127 which supports the centering mechanism bracket 126.

A cylindrical cam 180 is fixed to shaft 123, and the opposite end of lever 175 is provided with a cam roller 181. In the position illustrated in Fig. 2, the centering mechanism, including bracket 126 and vertically sliding guide bar 127, is biased to its working position by gravity, and its downward limit of movement is determined by the engagement of follower 181 with a low point in the contour of cylindrical cam 180. As cam 180 rotates, the depth of its contour increases to a maximum, the left end of lever 175 is depressed, and its right-hand is accordingly raised to raise bar 127 and the centering mechanism until the latter clears the ware and permits the movement of one turret away from the initial station and permits insertion of another piece of ware by arms 30 and 87.

When it is desired to adjust the centering mechanism vertically to center ware of a different height, a hand wheel 184 is manipulated. In Fig. 2, the numeral 185 designates a supporting bearing bracket which rotatably supports a pair of meshing bevel pinions 186 and 187. Pinion 186 has driving connection with hand wheel 184 by means of an intermediate shaft 188 and a pair of universal joints 189 and 190. Pinion 187 rests upon a bearing portion 191 of bracket 185 and is threaded internally to engage an adjusting screw 192, the lower end of which engages through yoke 176 and has a retaining nut 193 which permits screw 192 to raise and lower yoke 176.

When hand wheel 184 is rotated in one direction or the other, the rotation of bevel pinion 187, which is restrained against axial movement, causes screw 192 to raise or lower, and thus raise or lower yoke 176 and, by changing the fulcrum of lever 175, raises or lowers block 178 and thus adjusts the vertical disposition of the centering mechanism in both its up and down positions as it is reciprocated vertically through the operation of cam 180.

While the inserting and centering operation is being automatically performed at the work station designated 32 in Fig. 1, the preceding piece of ware is at the station designated 33 in Fig. 1, where its center well portion is automatically brushed to smooth its surface as indicated in Figs. 2 and 19, while the edge scraping operation previously alluded to is automatically performed at the same station, the mechanism for which will be described subsequently herein.

The brushing mechanism is illustrated in Figs. 1, 2, and 19 and will now be described. The brushing mechanism moves up and down cyclically in timed relationship with the indexing of table 25 to move the brush element down into brushing engagement with the center wells of successive pieces of ware and to move up out of the way to permit successive pieces of ware to move to and from the brushing and scraping station.

In Figs. 2 and 19 the numeral 200 designates a vertically slidable supporting bar for the brushing mechanism, guides therefor in upper casing 121 being designated 201 and 202 in Fig. 2. At its lower end supporting bar 202 is provided with brackets 203 and 204 which support bearings 205 and 206, the latter giving rotatable support to a brush shaft 207 which has a brush 208 fixed to its lower end. Bracket 204 is normally held fixed to bracket 203 by means of a flanged threaded bushing 209 and a cooperating nut 210, the latter having a radially projecting bar or handle 211 so that nut 210 may readily be loosened to swing bracket 204 and thus adjust the position of brush 208 in a horizontal plane.

Bearing 205 gives rotatable support to an intermediate brush drive shaft 212 which is restrained against axial movement relative to bearing 205. Brush 208 has an independent drive motor which may be mounted upon the top of upper casing 121 and is designated 213 in Fig. 1. Motor 213 is belt-connected, as at 214 to a shaft element 215 which is rotatable in a bearing 216 fixed to the upper side of casing 121 by means of a bracket 217.

Shaft element 215 is held against axial movement relative to bearing 214 and is internally splined to receive a spline formation 218 at the upper end of intermediate shaft 212. The lower end of intermediate shaft 212 has belt and pulley connection with brush shaft 207 as at 218 in Fig. 19. The foregoing construction permits continuous driving of brush 208 from motor 213 without interference with free vertical adjusting movement of the assembly comprising guide bar 200, outboard bearing brackets 203 and 204, shafts 207 and 212, and the brushing element 208 itself.

Referring to Fig. 2, a lever 220 is pivoted intermediately to a yoke 221 and one of its ends is bifurcated as at 222 to engage about a block 223 which is pivoted to guide bar 200. The opposite end of lever 220 has a cam roller 225 which engages a cylindrical cam 226 and the contour of the latter alternately rises and falls to raise and lower the brushing mechanism between an upper idle work-clearing position and the lower working position illustrated in Figs. 2 and 19.

It is desirable to provide vertical adjustment for the brushing mechanism to compensate for wear of the brush and to suit ware having different base styles. It is further desirable that this adjustment be made simply and accurately so that the brush may be selectively brought into brushing engagement with the surface of ware with just the right degree of brush pressure, and to this end yoke 221 is associated with a supporting screw 230 which is rotatable in yoke 221 but axially immovable relative thereto. An adjusting pinion 231 rests upon a bearing formation 232 of casing 121 and has screw threaded engagement with an adjusting screw 230. A mating bevel pinion 234 engages pinion 231 and is adapted to be rotated by an adjusting hand wheel 235 which connects with the supporting shaft of pinion 234 by means of an intermediate shaft 236 and a pair of universal joints 237 and 238.

It is desired that the turrets 26 be rotated on their respective axes to rotate the wear on holders 112 whenever a particular turret is at either the scraping station 33 or the edge finishing station designated 34. This result is achieved automatically by and upon movement of a turret to either of these two work stations by means illustrated in Figs. 1 and 12. Referring to Fig. 12, which shows a turret 26 at the final edge finishing station, a plain friction drive wheel 250 is secured coaxially to the lower end of the supporting shaft of each turret 26 beneath table 25.

Referring now to Fig. 1, a pair of V-belt pulleys 251 and 252 are carried by vertical shafts mounted in bearings secured to the top of base 40 as at 253 in Fig. 12. The shaft of pulley 252 projects downwardly through the upper wall of base 40 and is provided with a drive pulley 255. In Fig. 12 the cross-sectional plane is irregular, in the interests of more complete illustration. Therefore, pulley 255 is shown in Fig. 12 although the upper part of the shaft of pulley 252 and pulley 252 itself are cut away.

Referring now to Fig. 1, the scraping station 33 is also provided with a pair of pulleys 257 and 258 at the same level and in the same manner as the pulleys 251 and 252, and the shaft of pulley 258 extends below the top of base 40 where it carries a V-belt drive pulley 260 corresponding to pulley 255 of the edge finishing station. The foregoing belt drive has an independent driving motor 261 whose output pulley 262 is connected to pulleys 255 and 260 by means of a belt 263. A belt 265 extending about pulleys 251 and 252 and a belt 266 extending about pulleys 257 and 258 are in constant operation when the machine is running by reason of continuous operation of motor 261. Whenever a turret moves to either of the stations 33 or 34 its friction drive wheel 250 engages against the flat back of the V-belt associated with the particular work station, either 265 or 266, respectively, and the turret is automatically set into rotation.

The mechanism for automatically scraping from the edges of the ware the flash or fin occurring as a result of the methods of manufacture by which the ware is brought to this stage will now be described, having reference particularly to Fig. 1 and Figs. 15 through 18. A scraper element per se is shown in Fig. 17 and comprises a flexible blade 270 fixed to a horizontal pivot shaft 271 journaled in a block 272, the latter having a vertical pivot shaft 273.

Figure 17:
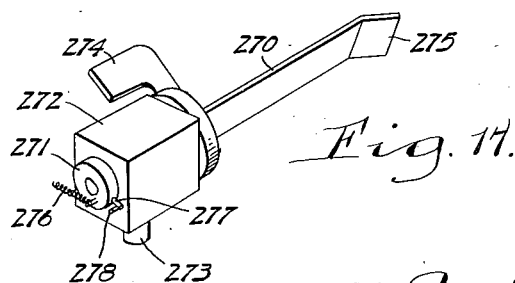
Fig. 17 is a detailed perspective view of one of the scraper elements employed with the mechanism of Figs. 15 and 16.

A radial wing 274 extends from the scraping blade for manipulation thereof and the blade is biased so that its outer scraping edge 275 faces somewhat downward, as shown in Fig. 17, by virtue of an extension coil spring 276 which tends to rotate shaft 271 in a clockwise direction as viewed in Fig. 17, such rotation being limited by engagement of a pin 277 carried by shaft 271 against a stop pin 278 fixed to block 272. However, a downward force on wing 274 will rotate shaft 271 against the resistance of spring 276 and cause blade 270 to rotate therewith and direct its scraping edge somewhat upwardly.

A complete cycle of movement of the scraping edge of blade 270, which scrapes the edge of the somewhat friable green ware in a resilient trailing fashion, is shown schematically in Fig. 18. In Fig. 18 the letter A designates the rest position of the scraper relative to the edge of a piece of ware designated 280. The position of initial contact with the edge of the ware is generally vertical and is designated B. The blade is then rotated to roll the scraping edge under the edge of the ware as at C, then reverses and rolls upwardly over the edge of the ware to the position shown at D, and then returns successively to initial scraping position B and idle position A, it being understood that the piece of ware is continuously rotating on its supporting turret during the foregoing scraping cycle.

Figure 15:
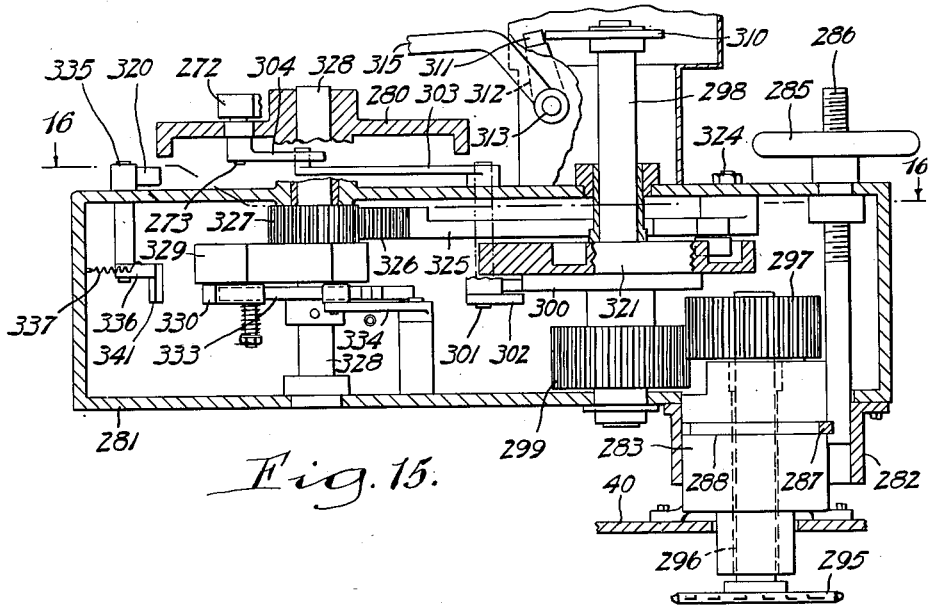
Fig. 15 is a longitudinal cross-sectional view of the mechanism for scraping the fin or flash from the edges of ware prior to the final finishing operation.

As shown in Fig. 1, a pair of scrapers 270 are mounted interchangeably on a turntable or turret 284, which is rotatably mounted upon a boxlike casing element 281. Referring to Fig. 15, casing 281 has a sleeve 282 fixed to its underside and sleeve 282 fits rotatably over a cylindrical mounting block or hub 283 which is fixed to the top of base 40 of the machine framework. Casing 281 houses the general drive means of the scraping mechanism and is mounted for both vertical adjustment and swinging movement about hub 283, the former for adjusting the height of the scraper to meet the edges of ware of various depths and the latter to adjust the scraper to act properly upon ware of different diameters.

As shown in Fig. 15, a hand wheel 285 is journaled in the upper wall of casing 281 and is internally threaded to receive an adjusting screw 286. The lower end of the adjusting screw 286 rotates in hub 283 and is notched at one side to receive a key 287 which also engages an external annular groove 288 in hub element 283. It will be seen from the foregoing that rotation of hand wheel 285 will raise or lower the casing 281 by raising or lowering movement of the hand wheel relative to adjusting screw 286, the latter being axially immovable relative to the mounting hub 283 by reason of key 287.

Referring to Fig. 1, a lever 289 is slotted to receive a pivot pin which projects downwardly from the bottom wall of casing 281 as at 290 and lever 289 is pivoted to the top of base 40 as at 291. The outer portion of lever 289 may be adjustably locked to a quadrant 292 as at 293. Loosening the wing nut or other fastening at 293 permits manipulation of lever 289 to swing casing 281 about hub element 283 and thus move the scraper itself radially relative to ware on the turret at the scraping station to a position for proper scraping engagement with the ware. The flexibility of the scraper per se permits it to scrape the edges of ware which is festooned or has otherwise irregularly ornamented edge formations in an entirely satisfactory manner without other compensation than that afforded by flexing of the scraper as it traverses the irregular edges.

In Fig. 1 a chain from the shaft 48 of the right angle drive unit 47 is designated 294 and engages a sprocket 295 fixed to a drive shaft 296 which extends through hub element 283 and has a drive pinion 297 at its upper end. Referring to Fig. 15, a cam shaft 298 is journaled in the upper and lower walls of casing 281 and has thereon a pinion 299 in mesh with drive pinion 297. One or both of pinions 297 and 299 may have relatively wide faces to insure adequate meshing engagement despite the position of vertical adjustment of casing 281 as determined by the setting of handwheel 285.

As mentioned previously herein, two scrapers 270 are illustrated in Fig. 1. The left-hand one, as there shown, is in an operative position, and the right-hand scraper is adapted to be positioned interchangeably in the working position in place of the one there shown in Fig. 1 in a manner and for reasons which will presently appear. Reference here is to the operative left-hand scraper 270 of Fig. 1. Periodic movement of the scraper 270 to the ware for each scraping cycle of operation from a withdrawn idle position is produced by means of a cam fixed to cam shaft 298 and designated 300 in Figs. 15 and 16.

A rock shaft 301 is journaled in the upper wall of casing 281 and has a cam follower arm 302 fixed thereto whose follower roller engages the periphery of cam 300. Above casing 281 rock shaft 301 has a second arm 303 fixed thereto, and the outer end thereof is bent upwardly as shown in Fig. 15 to engage against an arm 304 which is fixed to the pivot shaft 273 of block 272 beneath turntable 280. Arm 304 is biased in a counterclockwise direction by a spring 308. This is the idle position of scraper 270 and movement to operative scraping position is produced by engagement of arm 303 against arm 304 when the high part of the contour of cam 300 is acting against follower arm 302.

To produce the horizontal rotative movement of scraper 270 described in conjunction with Fig. 18 previously herein, a cam 310 is fixed to the upper end of cam shaft 298 and acts against a follower roller 311, carried by an arm 312, which is fixed to a rock shaft 313. Also fixed to rock shaft 313 is an arm designated 315 in Figs. 1 and 15, and the outer end of arm 15 carries an adjustable screw 316 whose lower end is arranged to have downward abutting engagement against wing 274 to rotate scraper 270 against the bias of spring 276. Cam 310 has two lobes, one higher than the other. The higher lobe acts against follower 311 first to depress wing 274 sufficiently to move the scraping edge of the blade to its lower extreme position, as at C in Fig. 18, and after wing 274 has been released through the passage of the higher lobe to permit the spring 276 to move the scraper to the position marked D in Fig. 18, the lesser lobe acts to return the blade downwardly to position B before the blade finally leaves the work.

To avoid the necessity of stopping the entire machine to change blades when a blade has become too dull for satisfactory use, means are provided for quickly bringing a new blade into proper working position while the blade which has been in use moves out of working position where it may be removed from turntable 280 for repair or replacement while the new blade takes over the scraping function. To this end means are provided for quickly indexing turntable 284 through 180° when desired by manipulating a lever designated 320 in Fig. 1.

Cam shaft 298 carries a face cam 321 whose cam groove receives a follower 322 carried by an arm 323 pivoted to the casing 281 as at 324. Arm 323 has an extension 325 formed with a toothed sector 326 which meshes with a pinion 327 which is freely rotatable on a shaft 328 which is fixed to and rotatably supports turntable 284. A pawl arm 329 is fixed to pinion 327 and carries a pawl 330 which has a tooth 331 for engagement in notches formed in the periphery of an indexing wheel 333, the latter being fixed for rotation with shaft 328 and turntable 284.

Figure 16:
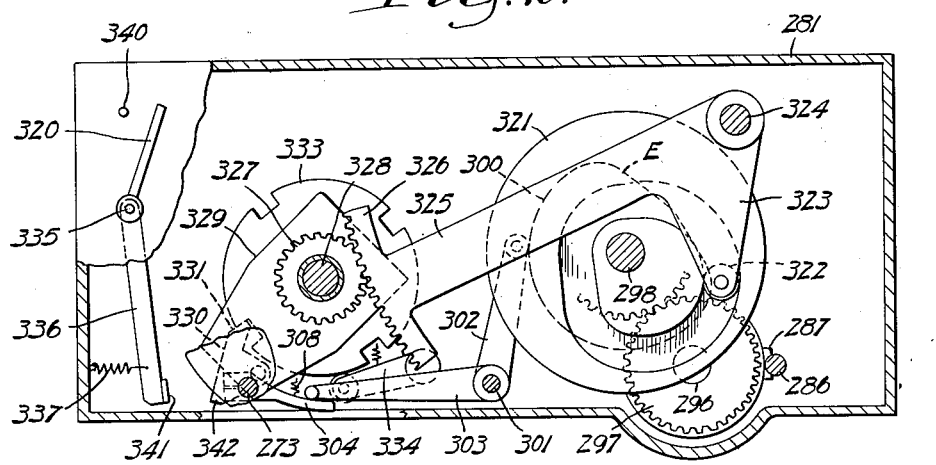
Fig 16 is a horizontal cross-sectional view of the mechanism of Fig. 15 taken approximately on the line 16—16 of Fig. 15.

A spring-biased arm 334 carries a detent roller for yieldable engagement in the notches of the indexing wheel to retain it in properly indexed position. The pivotal connection between pawl 330 and pawl arm 329 has enough friction to cause pawl 330 to yieldably retain any pivotal position to which it is positively moved through operation of the indexing mechanism. Referring particularly to Fig. 16, the previously described indexing lever 320 is fixed to a rock shaft 335 which extends downwardly through the top of casing 281 and carries an arm 336 which is biased in a clockwise direction as viewed in Fig. 16 by an extension coil spring 337. Lever 320 is manually movable toward and against a stop pin 340 against the resistance of spring 337 to place an offset lug 341, at the outer end of arm 336, in the path of a heel portion 342 formed on the back of pawl 330.

In normal operation of the scraping station, when the turntable 284 is not being indexed to position a new scraper in the working position, lever 320 with arm 336 are in the inactive position shown in Figs. 15 and 16, and pawl 330 is in a position out of engagement with the notches of indexing wheel 333, being swung somewhat counterclockwise from the position illustrated in Fig. 16. Under these conditions arm 325 and toothed sector 326 will oscillate through operation of cam 321, and pinion 327, with pawl arm 329, will oscillate through an angle slightly in excess of 180° but without effect on indexing wheel 333.

If, during this oscillation, lever 320 is manually operated to place lug 341 in the path of the heel portion 342 of pawl 330, then on the next counterclockwise oscillation of pawl arm 329, lug 341 will engage the side of heel 342 which is lowermost in Fig. 16, and pivot pawl 330 clockwise on pawl arm 329 to cause the tooth 331 of pawl 330 to move into a registering notch in indexing wheel 333. On the next clockwise oscillation of pinion 327 and pawl arm 329, indexing wheel 333 will be rotated 180°, carrying with it turntable 284 and thus positioning the opposite scraping implement in the working position.

At the beginning of the return counterclockwise oscillation of pawl arm 329, indexing wheel 333 will be resiliently restrained by the detent roller of arm 334, and the slanted rear surface of tooth 331 of pawl 330 will cam out of engagement with the notch of the indexing wheel and thus return pawl 330 pivotally to its idle position, in which position it will remain through subsequent oscillation of the pawl arm until the indexing lever 320 is again manually operated.

The final finishing operation for smoothing off the rounded contour of the edges of ware established by the scraping step is the station previously designated generally 34 and is illustrated in Figs. 1 and 12 through 14. Referring to Fig. 12, the final finishing apparatus is mounted upon a sliding base 375 which is mounted for lineal guided movement on a sub-base 376, the latter being fixed to plate element 57 of the machine framework. Sliding base 375 is arranged for sliding movement in a generally radial direction relative to the machine generally and the table 25 in particular to adjust the mechanism of this station for operation upon the edges of ware of various diameters. A hand wheel 378 and a conventional screw type adjusting arrangement designated generally 379 acts between the sliding base 375 and sub-base 376 to accurately adjust the relative radial spacing of this mechanism from the turret at this station.

It is also desired to readily adjust the relative vertical position of the final finishing apparatus to properly position the mechanism for finishing the edges of ware of various depths and to this end a frame member 380 which generally supports the operating parts of the mechanism is pivotally connected to a rigid up-standing support 381 on base 375 by means of pairs of parallel links 382 and 383. The upper links 382 include a downwardly projecting lug 384, and a screw 385 which is threaded through support 381 engages against lug 384, so that if screw 385 is screwed farther into support 381 the frame 380 and all of the mechanism carried thereby swings upwardly without disturbing its vertical attitude. The mass of frame 380 and its associated parts urges the framework downwardly and therefore holds the lug 384 in abutment with the end of screw 385.

The final smoothing of the previously scraped edge of the green chinaware is accomplished in a manner wholly novel to the pottery art by a form of dry abrasion which comprises applying to such edge surface a rapidly moving tape. In the present instance set forth by way of example the tape is ordinary woven cloth. As shown in Figs. 12, 13, and 14, this smoothing element comprises an endless belt or tape 387 which extends about a series of pulleys supported by frame member 380. Referring to Fig. 12 tape 387 passes over a drive pulley 388 and over a pair of adjacent idler pulleys 389 and 390 which provide an efficient angle of contact between the belt 387 and drive pulley 388. Drive pulley 388 is adapted to be constantly driven from an independent driving motor 391, which is carried by frame member 380 and is connected to the mounting shaft of pulley 388 by a belt as at 392 in Fig. 12.

Pulleys 389 and 390 are mounted for rotative movement directly against the frame member 380 and their pivot shafts support a pair of swinging arms 394 and 395, respectively. The outer ends of arms 394 and 395 are provided with idler pulleys 396 and 397, respectively, which rest upon the belt 387 by force of gravity and thus serve as belt tensioning devices. Between fixed idler pulley 392 and the swinging tension idler pulley 396, belt 390 passes over a further idler pulley 398 which is located relatively remotely on frame member 380 so as to increase the total belt length considerably. This lengthens the life of individual belts by distributing the wear over a greater length of belt and insures against any tendency of the belt to heat up unduly by frictional rubbing action against the ware.

The two final operating pulleys which control the rubbing or abrading action of belt 387 against the edge of the ware are designated 400 and 401 and are rotatably secured to a supporting arm 403 which shows most clearly in Fig. 13. A plate 406 is pivotally secured to frame 380 at one end as at 407 for swinging movement about a generally horizontal axis. At its outer end plate 406 has a bearing 408 which pivotally supports a shaft 409. Shaft 409 has an offset extension 410 which shows best in Fig. 1, and extension 410 connects rigidly with the arm 403 which supports pulleys 400 and 401.

An operating arm 412 is fixed to shaft 409 adjacent to bearing 408 of plate 406, and its outer end is pivotally engaged by a piston rod 414 of a pneumatic operating cylinder 415, the opposite end of which is pivoted to frame 380 as at 416. An extension coil spring 418 connects between the lower end of cylinder 415 and a point on plate 406 adjacent to bearing formation 408. Upward pivotal movement of plate 406 is adjustably limited by engagement against a stop screw 420 carried by frame 380 and joint pivotal movement of shaft 409 and pulley-carrying arm 403 about the axis of shaft 409 is limited in a counterclockwise direction by a stop screw 421 which is adjustably secured to a bracket 422 which is fixed for rotation with shaft 409. The end of screw 421 engages against the upper surface of plate 406 to limit counterclockwise pivotal movement of shaft 409.

The operation of the pulley mechanism in approaching the ware and executing a final finishing cycle of operation is as follows. The initial idle position of this portion of the mechanism is shown in Fig. 14 wherein the portion of belt 387 extending between pulleys 400 and 401 is spaced clear of the edge of the ware. In this position, connecting rod 414 is in an extreme downward position by reason of pneumatic pressure applied to the top side of cylinder 415. Plate 406 is thus held in the downward position illustrated in Fig. 14, by the force of the piston rod acting through arm 412 and stop screw 421, against the resistance or upward pull of spring 418.

As the piston of pneumatic cylinder 415 moves upward upon a reversal of the air pressure connections thereto, the plate 406 moves upwardly first about its pivotal connection 407. This movement is under the force of spring 418, and the action of piston rod 414 is actually merely permissive in this phase of movement. This movement of plate 406 brings the working portion of belt 390 against the edge of the ware in a lowermost position as illustrated in Fig. 12. It may be observed that the center line or axis of shaft 409 is substantially coincident with the center of the radius of the edge of the ware when plate 406 is in the upper position shown in Figs. 12 and 12, as it appears best in the latter figure.

At this time further upward movement of plate 406 is prevented by abutment thereof against screw 420, so that continued upward pull of piston rod 314 acts through arm 412 to rockshaft 409 is a clockwise direction as viewed in Fig. 12 to cause the tape carrying pulleys 400 and 401 to be revolved about the axis of shaft 409 by reason of their support from the offset extension 410 of shaft 409. This causes the portion of the belt which is in contact with the edge of the ware to pass smoothly around the edge of the rotating ware and abrade the same to impart a smooth final finish to the edge. The revolving upward movement continues until the piston rod is in its fully up position and pulleys 401 and 402 are in the position illustrated in Fig. 13.

At this time a further reversal of the air connections of pneumatic cylinder 415 projects piston rod 414 downwardly and thus causes a reversal of rotation of shaft 409, and since plate 406 is still urged upwardly by spring 418, the pulley-carrying arm 403 is first rocked to the position of Fig. 12 to make a second pass of the belt across the edge of the ware. Further continued downward movement of piston rod 414 after stop screw 421 comes into engagement with plate 406 causes the entire mechanism supported by plate 406 to swing downwardly against the resistance of spring 418 to the idle initial position of Fig. 14.

The timing of the reversal of the application of pneumatic pressure to cylinder 415 is under the control of a cam, designated 430 in Fig. 3, which is mounted upon cam shaft 42 and operates upon a conventional air valve 431, the latter having an operating member including a cam follower 432.

Referring to Fig. 2, cams designated 435, 436, and 437 are fixed to vertical shaft 123 in column 120 and act against the operating members of vacuum valves 438, 439, and 440, respectively, through cam followers 441, 442, and 443, also respectively. Valve 438 controls the timing of the application of sub-atmosphere pressure to vacuum pad 80 of pick-up arm 30; valve 439 controls the timing of the application of sub-atmospheric pressure to the suction pad 89 of turnover arm 87; and valve 440 exercises a similar function in conjunction with the vacuum pad of discharge arm 38.

What is claimed is:

1. Apparatus for finishing the edges of generally circular dry unfired clay ware which comprises means for supporting a piece of ware for rotation on its own axis, a scraper blade mounted for movement about an axis generally tangent to the ware, means for moving the ware supporting means and the scraper blade relatively toward each other for scraping the edge of the rotating ware and means of oscillating the scraper during scraping to round off the edge of the ware, and final edge finishing means comprising an endless belt moving in a direction transverse to the edge of the ware and engageable against the edge of the rotating ware to smooth the edge by abrasion.

2. Apparatus for finishing the edges of generally circular dry unfired clay ware which comprises means for supporting a piece of ware for rotation on its own axis, a scraper blade mounted for movement about an axis generally tangent to the ware, means for moving the ware supporting means and the scraper blade relatively toward each other for scraping the edge of the rotating ware and means for oscillating the scraper during scraping to round off the edge of the ware, and final edge finishing means comprising an abrading element engageable against the scraped edge of the rotating ware to smooth the same.

3. Apparatus for finishing the edges of generally circular dry unfired clay ware which comprises means for supporting a piece of ware for rotation on its own axis, a scraper blade mounted for movement about an axis generally tangent to the ware, means for moving the ware supporting means and the scraper blade relatively toward each other for scraping the edge of the rotating ware and means for oscillating the scraper during scraping to round off the edge of the ware, and final edge finishing means comprising an endless belt moving in a direction transverse to the edge of the ware and engageable against the edge of the rotating ware to smooth the edge by abrasion, and guide means for said belt movable to apply the belt progressively around the rounded edge of the ware.

4. Apparatus for finishing the edges of generally circular dry unfired clay ware which comprises means for supporting a piece of ware for rotation on its own axis, a scraper blade mounted for movement about an axis generally tangent to the ware, means for moving the ware supporting means and the scraper blade relatively toward each other for scraping the edge of the rotating ware and means for oscillating the scraper during scraping to round off the edge of the ware, and final edge finishing means comprising an abrading element engageable against the edge of the rotating ware, and means for moving the abrading element to apply the same progresively around the rounded scraped edge of the ware.

5. Apparatus for finishing the edges of generally circular dry unfired clay ware which comprises means for supporting a piece of ware for rotation on its own axis, a flexible scraper blade mounted for movement about an axis generally tangent to the ware, means for moving the ware supporting means and the scraper blade relatively toward each other with the scraper mounted to drag yieldably along the edge of the rotating ware, and means for oscillating the scraper during scraping to round off the edge of the ware, and final edge finishing means comprising an endless belt moving in a direction transverse to the edge of the ware and engageable against the edge of the rotating ware to smooth the edge by abrasion.

6. Apparatus for finishing the edges of generally circular dry unfired clay ware which comprises means for supporting a piece of ware for rotation on its own axis, a flexible scraper blade mounted for movement about an axis generally tangent to the ware, means for moving the ware supporting means and the scraper blade relatively toward each other with the scraper mounted to drag yieldably along the edge of the rotating ware, and means for oscillating the scraper during scraping to round off the edge of the ware, and final edge finishing means comprising an abrading element engageable against the scraped edge of the rotating ware to smooth the same.

7. Apparatus for finishing the edges of generally circular dry unfired clay ware which comprises means for supporting a piece of ware for rotation on its own axis, a scraper blade, means for moving the ware supporting means and the scraper blade relatively toward each other for scraping the edge of the rotating ware, and final edge finishing means comprising an endless belt moving in a direction at right angles to the edge of the ware and engageable against the scraped edge of the rotating ware to smooth the same by abrasion.

8. Apparatus for finishing the edges of generally circular dry unfired clay ware which comprises means for supporting a piece of ware for rotation on its own axis, a scraper blade, means for moving the ware supporting means and the scraper blade relatively toward each other for scraping the edge of the rotating ware, and final edge finishing means comprising an abrading element engageable against the scraped edge of the rotating ware to smooth the same.

9. Apparatus for finishing the edges of generally circular dry unfired clay ware which comprises means for supporting a piece of ware for rotation on its own axis, a flexibly mounted scraper and means for moving the ware supporting means and the scraper relatively toward each other with the scraper positioned to drag yieldably along the edge of the rotating ware to remove the rough edge therefrom, and final edge finishing means comprising an endless belt moving in a direction transverse to the edge of the ware and engageable thereagainst while the ware is rotating to smooth the edge of the ware by abrasion.

10. Apparatus for finishing the rough edges of generally circular dry unfired clay ware which comprises means for supporting a piece of ware for rotation on its own axis, a flexibly mounted scraper and means for moving the ware supporting means and the scraper relatively toward each other with the scraper positioned to drag yieldably along the edge of the rotating ware to remove the rough edge therefrom, and final edge finishing means comprising an abrading element engageable against the scraped edge of the ware while the ware is rotating to smooth the same.

11. Apparatus for treating the edges of generally circular dry unfired clay ware to remove the rough edge therefrom comprising means for supporting the ware for rotation on its own axis, a flexible scraper blade movable to and from engagement with the edges of successive pieces of ware, said scraper blade being mounted for rotation on an axis generally tangent to the edge of the ware, and means for oscillating the scraper on said last-mentioned axis to cause the scraper to traverse the edge in a curved path between the upper and lower surfaces of the rotating ware at the edge thereof to round off the latter.

12. Apparatus for treating the edges of generally circular dry unfired clay ware to remove the rough edge therefrom comprising means for supporting the ware for rotation on its own axis, a flexible scraper blade engageable with the edges of successive pieces of ware and mounted for rotation on an axis generally tangent to the edge of the ware, and means for oscillating the scraper on said last-mentioned axis to cause the scraper to traverse the edge in a curved path between the upper and lower surfaces of the rotating ware at the edge thereof to round off the latter.

13. Apparatus for treating the edges of generally circular dry unfired clay ware to remove the rough outer edge therefrom comprising means for supporting the ware for rotation on its own axis, a flexibly mounted scraper blade movable to and from engagement with the edges of successive pieces of ware, and so arranged that in work-engaging position it drags flexibly along the edge of the rotating ware, said scraper blade being mounted for rotation on an axis generally tangent to the edge of the ware, and means for oscillating the scraper on said last-mentioned axis to cause the scraper to traverse the edge in a curved path between the upper and lower surfaces of the ware at the edge thereof to round off the latter.

14. Apparatus for treating the edges of generally circular dry unfired clay ware to remove the rough edge therefrom comprising means for supporting the ware for rotation on its own axis, a flexibly mounted scraper blade arranged to drag flexibly along the edge of the rotating ware, said scraper blade being mounted for rotation on an axis generally tangent to the edge of the ware, and means for oscillating the scraper on said last-mentioned axis to cause the scraper to traverse the edge in a curved path between the upper and lower surfaces of the ware at the edge thereof to round off the latter.

15. Apparatus for finishing generally circular dry unfired clay ware which comprises a rotatable support and a circular series of work holding devices disposed concentrically with the axis of the support, said support being rotatable periodically to advance each work holding device to the position of the preceding work holding device, the positions of the several work holding devices when the support is at rest comprising a plurality of operating stations, means at one of said stations for scraping the edges of ware, means at a subsequent station for abrading the scraped edge surface, and means at said scraping and abrading stations for rotating the work holding devices to rotate the ware about its axis during scraping and abrading.

16. Apparatus for finishing generally circular dry unfired clay ware which comprises a rotatable support and a circular series of work holding devices disposed concentrically with the axis of the support, said support being rotatable periodically to advance each work holding device to the position of the preceding work holding device, the positions of the several work holding devices when the support is at rest comprising a plurality of operating stations, means at one of said stations for scraping the edges of ware, means at a subsequent station for abrading the scraped edge surface, means at said scraping and abrading stations for rotating the work holding devices to rotate the ware about its axis during scraping and abrading, and means at said scraping and abrading stations for rotating the scraping and abrading means about axes generally tangent to the edge of the ware to cause the scraping and abrading means to traverse the generally rounded edges of ware.

17. Apparatus for finishing generally circular dry unfired clay ware which comprises a rotatable support and a circular series of work holding devices disposed concentrically with the axis of the support, said support being rotatable periodically to advance each work holding device to the position of the preceding work holding device, the positions of the several work holding devices when the support is at rest comprising a plurality of operating stations, means at one of said stations for scraping the edges of ware comprising a flexible scraping blade mounted to drag yieldably along the edge of rotating ware, means at a subsequent station for abrading the scraped edge surface, and means at said scraping and abrading stations for rotating the work holding devices to rotate the ware about its axis during scraping and abrading.

18. Apparatus for finishing generally circular dry unfired clay ware which comprises a rotatable support and a circular series of work holding devices disposed concentrically with the axis of the support, said support being rotatable periodically to advance each work holding device to the position of the preceding work holding device, the positions of the several work holding devices when the support is at rest comprising a plurality of operating stations, means at one of said stations for scraping the edges of ware, belt means at a subsequent station for abrading the scraped edge surface by movement across said edge surface, and means at said scraping and abrading stations for rotating the work holding devices to rotate the ware about its axis during scraping and abrading.

19. Apparatus for finishing generally circular dry unfired clay ware which comprises a rotatable support and a circular series of work holding devices disposed concentrically with the axis of the support, said support being rotatable periodically to advance each work holding device to the position of the preceding work holding device, the positions of the several work holding devices when the support is at rest comprising a plurality of operating stations, means at one of said stations for scraping the edges of ware comprising a flexible scraping blade mounted to drag yieldably along the edge of rotating ware, belt means at a subsequent station for abrading the scraped edge surface by movement across said edge surface, and means at said scraping and abrading stations for rotating the work holding devices to rotate the ware about its axis during scraping and abrading.

20. In the manufacture of chinaware or pottery, the method of finishing the rough edges of dry, unfired clay ware of generally circular outline which comprises rotating the ware and scraping the edge thereof to impart the proper general edge contour thereto, and subsequently polishing the scraped surface by moving a dry band having the surface characteristics of cloth relatively rapidly thereacross.

21. In the manufacture of chinaware or pottery, the method of finishing the rough edges of ware of generally circular outline in the dried unfired state which comprises rotating the ware and scraping the edge thereof to impart the proper general edge contour thereto, and subsequently polishing the scraped surface by moving a dry band having the surface characteristics of cloth relatively rapidly there across.

22. In the manufacture of chinaware or pottery, the method of polishing the edges of dry, unfired clay ware of generally circular outline which comprises rotating the ware and simultaneously moving a dry band having the abrasive characteristics of cloth relatively rapidly thereacross.

23. In the manufacture of chinaware or pottery, the method of finishing the edges of ware of generally circular outline in the dried, unfired green state which comprises rotating the ware and scraping the edge thereof to impart the proper general edge contour thereto, and subsequently polishing the scraped surface by subjecting it to abrasion.

24. In the manufacture of chinaware or pottery, the method of finishing the rough edges of dry, unfired clay ware of generally circular outline which comprises rotating the ware and scraping the rough edge therefrom, and subsequently polishing the scraped surface by subjecting it to abrasion.

HOWARD G. ALLEN.
ROBERT W. WATKIN.
STANLEY KUFEL, JR.
EDWARD I. FISHER.

REFERENCES CITED

The following references are of record in the file of this patent:

UNITED STATES PATENTS

| Number | Name | Date |
| --- | --- | --- |
| 710,742 | Birkholz | Oct. 7, 1902 |
| 827,388 | Paul | July 31, 1906 |
| 1,365,583 | Brown | Jan. 11, 1921 |
| 1,675,183 | Loeffler | June 26, 1928 |
| 1,762,387 | Dengler | June 10, 1930 |
| 1,881,162 | Aurori et al. | Oct. 4, 1932 |
| 1,971,206 | Adelmann | Aug. 21, 1934 |
| 2,148,871 | Miller | Feb. 28, 1939 |
| 2,409,953 | Pash | Oct. 22, 1946 |
| 2,455,744 | Emerson | Dec. 7, 1948 |
| 2,489,811 | Perkins | Nov. 29, 1949 |